US006585264B2

(12) United States Patent
Benett

(10) Patent No.: US 6,585,264 B2
(45) Date of Patent: Jul. 1, 2003

(54) GAMING MACHINE WITH CHESS GAME FEATURE

(75) Inventor: Nicholas Luke Benett, South Wales (AU)

(73) Assignee: Aristocrat Technologies Australia Pty Ltd. (AU)

( * ) Notice: Subject to any disclaimer, the term of this patent is extended or adjusted under 35 U.S.C. 154(b) by 0 days.

(21) Appl. No.: 09/999,045

(22) Filed: Nov. 15, 2001

(65) Prior Publication Data

US 2003/0090057 A1 May 15, 2003

(51) Int. Cl.[7] .......................... A63F 13/00; G07F 17/34

(52) U.S. Cl. .............................. 273/143 R; 273/138.1; 273/138.2; 463/20

(58) Field of Search .......................... 273/143 R, 138.2, 273/138.1; 463/20

(56) References Cited

U.S. PATENT DOCUMENTS 6,089,977 A * 7/2000 Bennett ...................... 463/20
6,251,013 B1 * 6/2001 Bennett ...................... 463/13
6,290,600 B1 * 9/2001 Glasson ...................... 463/20

* cited by examiner

*Primary Examiner*—Benjamin H. Layno
(74) *Attorney, Agent, or Firm*—Fish & Richardson P.C.

(57) ABSTRACT

A gaming machine 10 has a display 14 and a game controller arranged to control images displayed on the display 14. The game controller is arranged to play a wagering game 16 wherein at least one random event is caused to be displayed on the display 14 and, if a predefined winning event occurs, the machine 10 awards a prize. At least one representation of a playing piece of a predetermined board game, where each type of such playing piece has a predefined movement pattern in the board game, is displayed on the display 14. Each representation of the playing piece has its predefined movement pattern as it applies in the board game. At, at least, an end position to which the representation of the playing piece moves, the control means performs an operation on an underlying symbol of the wagering game 16.

10 Claims, 4 Drawing Sheets

GAMING MACHINE WITH CHESS GAME FEATURE

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the games as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and game features which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a wagering game wherein at least one random event is caused to be displayed on the display means and, if a predefined winning event occurs, the machine awards a prize, the gaming machine being characterized in that at least one representation of a playing piece of a predetermined board game, where each type of such playing piece has a predefined movement pattern in said board game, is displayed, the, or each, representation of the playing piece having its predefined movement pattern as it applies in the board game, and at, at least an end position to which said representation of the playing piece moves, the control means performs an operation on an underlying symbol of the wagering game.

Preferably, the gaming machine includes a plurality of representations of playing pieces, each playing piece functioning as a substitute symbol. Hence, the operation performed by the control means is to cause the representation of the playing piece to act as a substitute for the underlying, standard symbol of the game.

The control means may make a determination, at each position to which each representation of the playing piece moves, as to whether or not the playing piece is to act as a substitute for the underlying symbol. The control means may be pre-programmed to make the determination so that, in effect, the determination is predetermined. Instead, the control means may make the determination at the time the representation of the playing piece moves to a position.

The board game may be a chess game and the representations of playing pieces may then be representations of chess pieces, each of which functions as a substitute symbol, and each of which moves according to its normal movement pattern in the chess game. For ease of explanation, each substitute symbol shall be referred to as a "chess piece".

The wagering game is, preferably, a spinning reel game. The invention will be described below with reference to its application to a spinning reel wagering game.

The display means may include a conventional display of spinning reels such as, for example, five reels each displaying three display positions or four reels each displaying four positions. Instead, the display means may include a matrix of display positions where each display position displays a single symbol at a time.

Where the chess piece can move in a number of directions from its initial display position, the control means may make a determination as to the direction in which the chess piece is to move. The determination may be a random determination.

When the chess piece moves according to its movement pattern it may replace any standard symbol in a display position in the movement pattern of the chess piece to which the chess piece moves and may act as a substitute for such standard symbol. Instead, when the chess piece moves from its initial display position to another position in its normal movement pattern, a determination may be made by the control means, when the chess piece is at said other position, as to whether or not a substitution is to be made and, if a substitution is to be made, the chess piece acts as a substitute for the underlying symbol. If the determination is that no substitution is to be made, no substitution of the underlying symbol takes place and, if applicable, the chess piece moves to its following position in its movement pattern.

Still further, at each position to which the chess piece moves, a prize, if applicable, may be paid when the chess piece moves to that position.

If the chess piece moves from a previous position to a further position in its normal movement pattern, the chess piece may continue acting as a substitute in the previous position only if a representation of the chess piece remains at that previous position.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
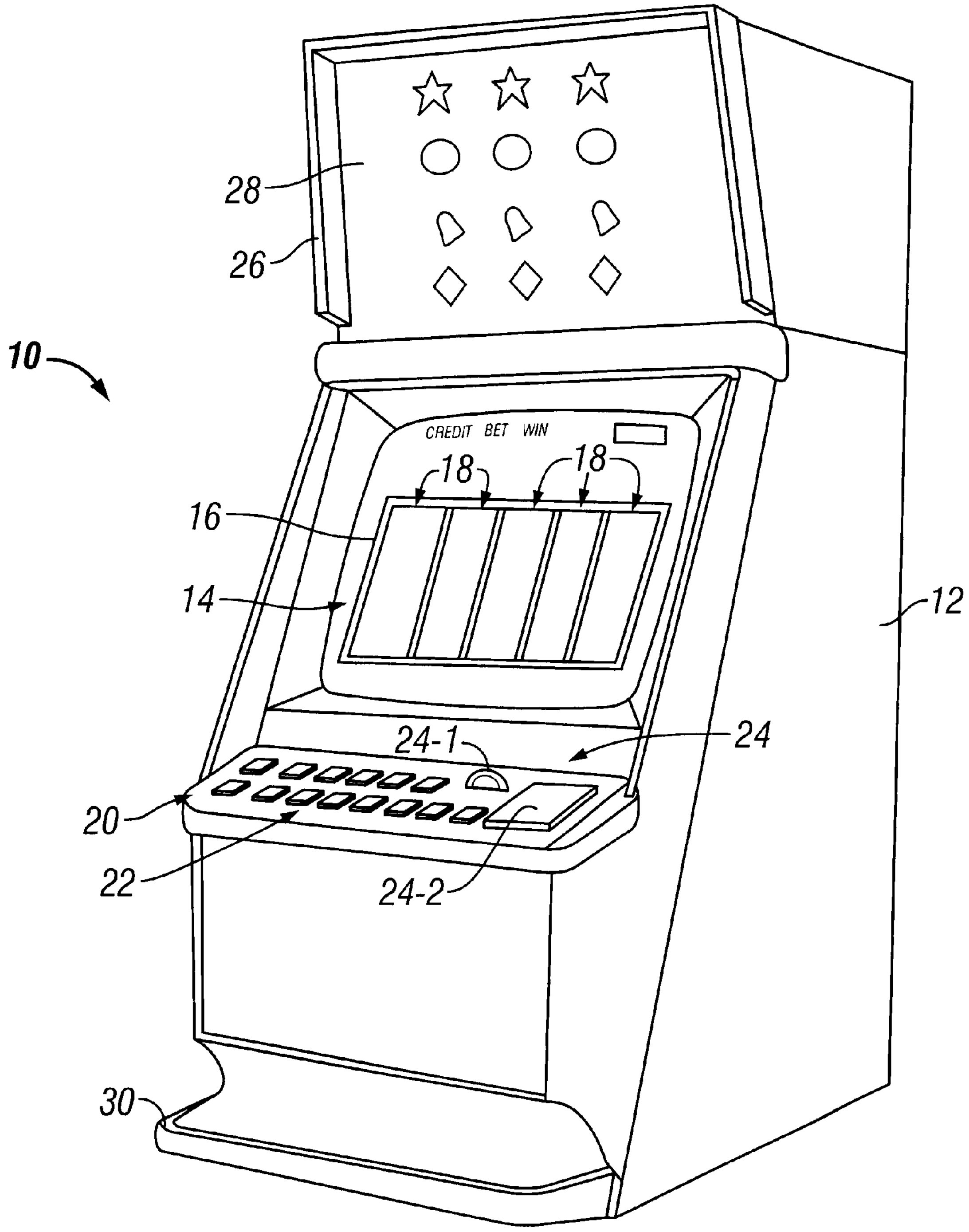
FIG. 1 shows a three dimensional view of a gaming machine, in accordance with the invention.

In FIG. 1, reference numeral 10 generally designates a gaming machine, including a game, in accordance with the invention. The machine includes a console 12 having a video display unit 14 on which a game 16 is played, in use. The preferred form of the game 16 is a spinning reel game which simulates the rotation of a number of spinning reels 18. It will, however, be appreciated that the invention is equally applicable to other types of games such as card games or ball games such as Keno, or the like. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
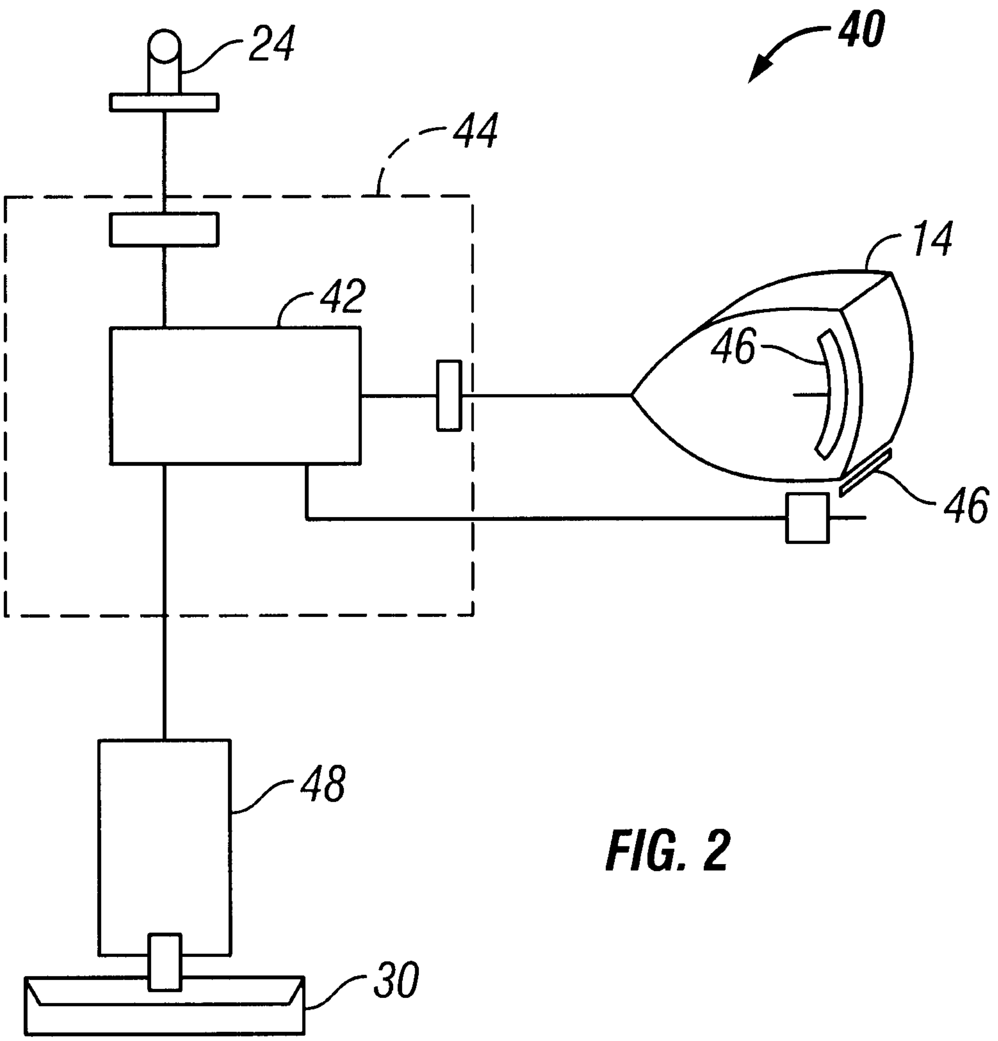
FIG. 2 shows a block diagram of a control circuit of the gaming machine.

Referring now to FIG. 2 of the drawings, a control means or control circuit 40 is illustrated. A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors mounted in the screen. The controller 44 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 44 drives a payout mechanism 48 which, for example, may be a coin hopper for feeding coins to the coin tray 30 to make a pay out to a player when the player wishes to redeem his or her credit.

Figure 3:
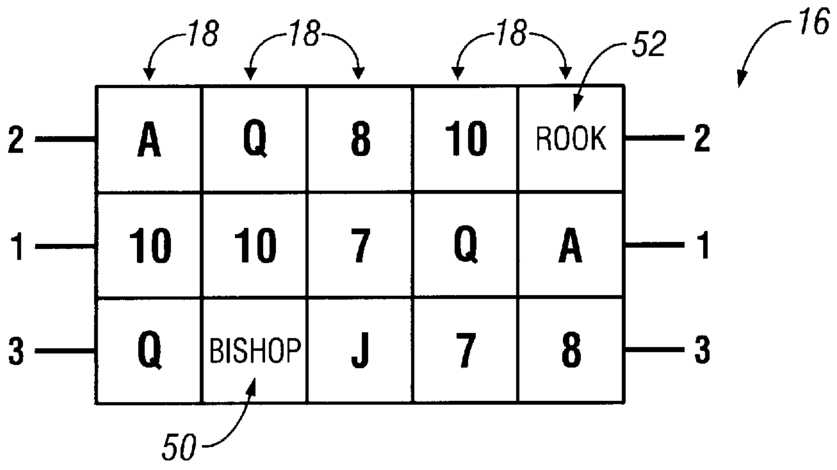
FIGS. 3 to 6 show schematic screen displays of one example of a game played on the gaming machine, in accordance with the invention.

In the embodiment of the invention illustrated in FIGS. 3 to 6 of the drawings, an initial screen display of the game 16 is shown in FIG. 3 of the drawings.

The game 16 is a spinning reel game having five reels, each of which shows three display positions. Another embodiment of the invention which is not illustrated could have separate display positions arranged in a matrix. The matrix may be 4×4 matrix. Each position of the matrix only displays one position at a time.

Each reel 18 carries substitute symbols thereon. The substitute symbols are representations of chess pieces. The chess pieces are a King, a Queen, a Bishop, a Knight or Horse, a Rook or Castle and a Pawn. Moreover, each chess piece substitute symbol has its own substitute function and the relevant chess piece moves in its normal movement pattern as it would in a conventional chess game.

In general, whenever any chess piece substitute symbol is spun up and displayed, then after any applicable wins have been paid, the chess piece will make one move, ie. from its initial display position to a following display position, according to its normal chess movement pattern. If there is more than one direction in which such a move can be made, then, initially, one direction of movement is randomly selected by the controller 44 of the gaming machine 10. As the chess piece moves to each position in its pattern, it being understood that there is an underlying symbol at each such position, it changes the underlying symbol to that chess piece. When it has completed its move, all wins will be paid in which one or more of the chess pieces substitutes.

In various embodiments of the game, a bonus may be given if a chess piece substitute symbol lands on the location of another chess piece substitute symbol during its move. Instead, a chess piece substitute symbol may be blocked from moving if another chess piece substitute symbol is in its path.

In the example illustrated in FIGS. 3 to 6, it is assumed that all symbols pay from left to right and prizes are only paid for combinations for three or more of a symbol. In addition, it is assumed that there are three active play lines.

In the initial display shown in FIG. 3 of the drawings, there are no winning combinations and no initial prize is paid. However, two substitute symbols, being a Bishop 50 and a Rook 52, are spun up on the second and fifth reels 18, respectively.

The Bishop 50 could move diagonally in two directions; either along the third and fourth reels or into the first reel. In the illustrated embodiment, the controller 44 of the gaming machine 10 selects the direction of movement of the Bishop 50 as it does of the Rook 52. It will be appreciated that the Rook 52 could either move vertically, only along the visible display positions of the fifth reel, or horizontally, in a line across all five reels 18 from its position in the fifth reel. Once again, the controller 44 determines in which direction the Rook 52 will move.

Figure 4:
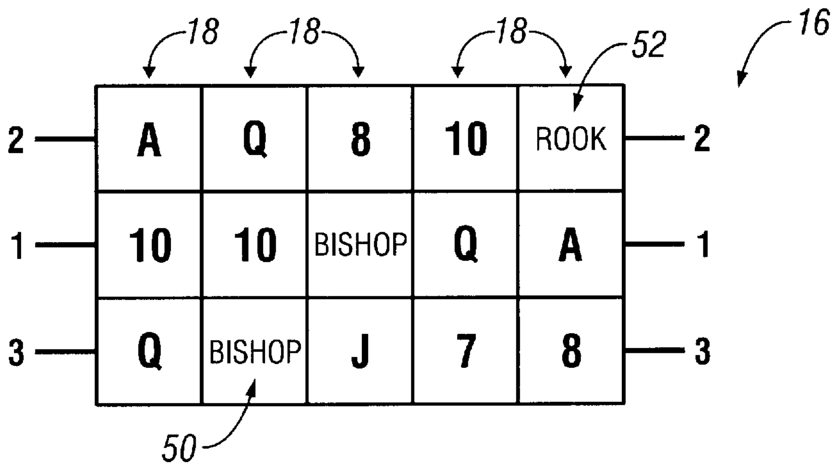
Figure 5:
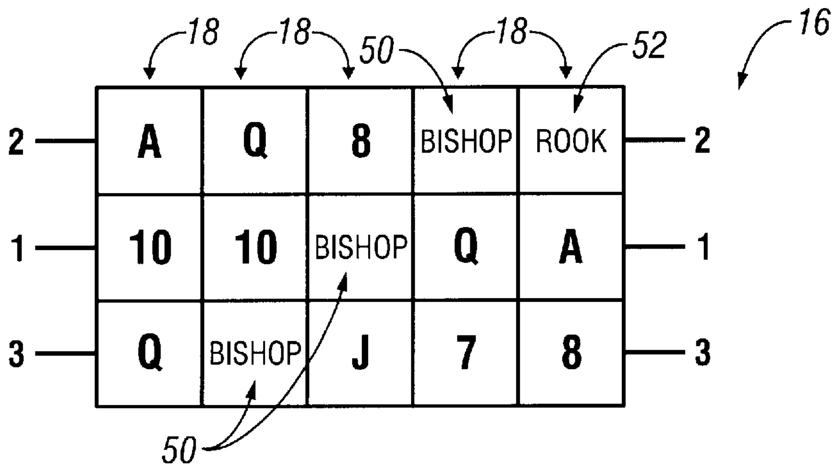
Figure 6:
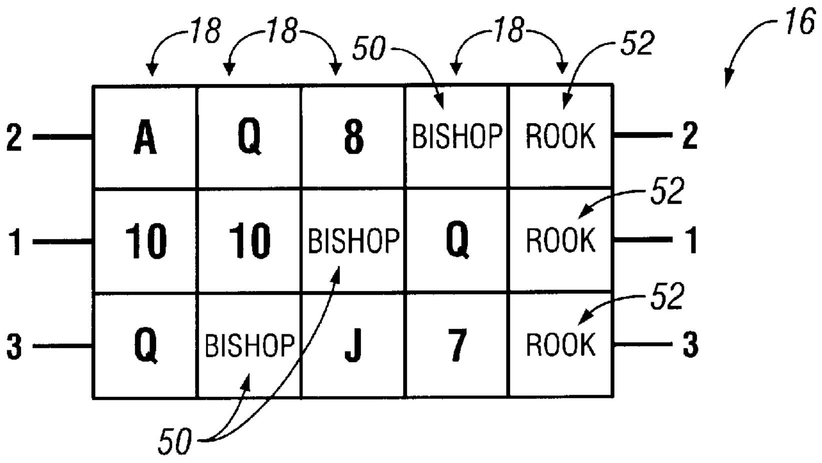

As illustrated in FIGS. 4 and 5 of the drawings, the direction selected for movement of the Bishop 50 is across the third and fourth reels. Accordingly, once the initial screen 16 as shown in FIG. 3 has been spun up and a determination has been made that no prizes are to be paid, the Bishop 50 begins to migrate, firstly into the central display position on the third reel and, finally, as shown in FIG. 5 of the drawings, into the upper display position on the fourth reel. At each position, it replaces the underlying symbol with a Bishop symbol.

Thereafter, the Rook 52 begins its move and the controller 44 determines that the Rook 52 moves along the fifth reel 18.

Once the Rook 52 has completed its move and changed any underlying symbols into Rooks, any bonus prizes to be awarded are determined and paid. In the illustrated embodiment of FIGS. 3 to 6, the only prize paid is for 3×10 with the Bishop 50 substituting.

Figure 7:
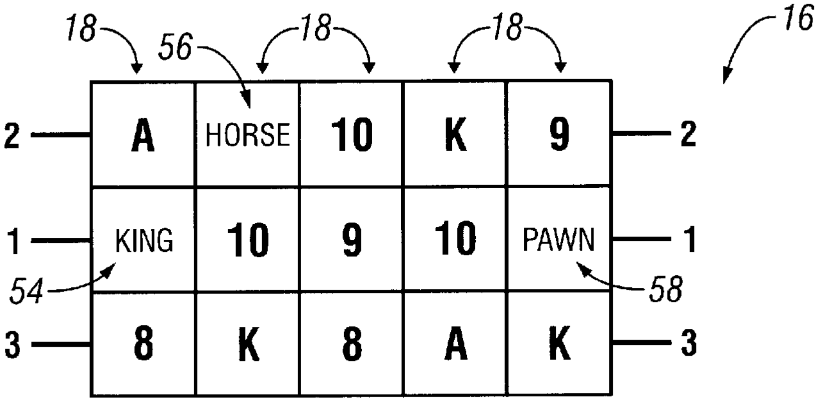
FIGS. 7 and 8 show schematic screen displays of another example of the game played on a gaming machine, in accordance with the invention.
Figure 8:
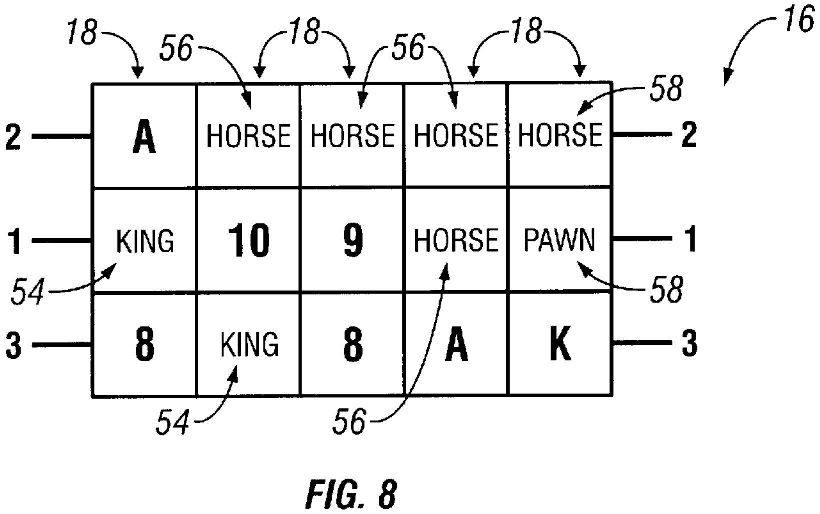

Referring now to FIGS. 7 and 8 of the drawings, a second embodiment of the invention is illustrated. With reference to the previous drawings, like reference numerals refer to like parts, unless otherwise specified.

In FIG. 7, three chess piece substitute symbols are spun up being a King 54, a Horse 56 and a Pawn 58. It will be appreciated that the King 54 could make five potential moves from its location on the first reel, the Horse 56 could make three potential moves from its position on the second reel and the Pawn 58 can only make a single move forward (which is assumed to be upwards) from its position on the fifth reel.

In the example shown in FIG. 7 of the drawings, no initial prize winning combinations are spun up. The three chess piece substitute symbols 54, 56 and 58 then complete their moves in a random or predetermined order to provide the display screen as shown in FIG. 8 of the drawings. This results in a prize for 5×A on payline two and 3×8 on payline three.

Accordingly, it is an advantage of the invention that a game for a gaming machine is provided which will enhance player enjoyment and encourage playing of the gaming machine 10.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A gaming machine having a display means and a game control means arranged to control images displayed on the display means, the game control means being arranged to play a wagering game wherein at least one random event is caused to be displayed on the display means and, if a predefined winning event occurs, the machine awards a prize, wherein, when at least one representation of a playing piece of a predetermined board game, where each type of such playing piece has a predefined movement pattern in said board game, is displayed, the at least one representation of the playing piece moves in a pattern corresponding to the predefined movement pattern of that playing piece as it applies in the board game, and at least an end position to which said representation of the playing piece moves, the control means performs an operation on an underlying symbol of the wagering game.

2. The gaming machine of claim 1 which includes a plurality of representations of playing pieces, each playing piece functioning as a substitute symbol.

3. The gaming machine of claim 2 in which the control means makes a determination, at each position to which each representation of the playing piece moves, as to whether or not the playing piece is to act as a substitute for the underlying symbol.

4. The gaming machine of claim 2 in which the board game is a chess game and the representations of playing pieces are representations of chess pieces, each of which functions as a substitute symbol, and each of which moves according to its normal movement pattern in the chess game.

5. The gaming machine of claim 4 in which, where the chess piece can move in a number of directions from its initial display position, the control means makes a determination as to the direction in which the chess piece is to move.

6. The gaming machine of claim 5 in which the determination is a random determination.

7. The gaming machine of claim 4 in which, when the chess piece moves according to its movement pattern it replaces any standard symbol in a display position in the movement pattern of the chess piece to which the chess piece moves and acts as substitute for such standard symbol.

8. The gaming machine of claim 4 in which, when the chess piece moves from its initial display position to another position in its normal movement pattern, a determination is made by the control means, when the chess piece is at said other position, as to whether or not a substitution is to be made and, if a substitution is to be made, the chess piece acts as a substitute for the underlying symbol.

9. The gaming machine of claim 4 in which, at each position to which the chess piece moves, a prize, if applicable, is paid when the chess piece moves to that position.

10. The gaming machine of claim 4 in which if the chess piece moves from a previous position to a further position in its normal movement pattern, the chess piece continues acting as a substitute in the previous position only if a representation of the chess piece remains at that previous position.

* * * * *